(12) United States Patent
Hwang et al.

(10) Patent No.: US 7,453,790 B2
(45) Date of Patent: Nov. 18, 2008

(54) INFORMATION STORAGE MEDIUM AND METHOD AND APPARATUS FOR RECORDING DATA THEREON

(75) Inventors: Wook-yeon Hwang, Gyeonggi-do (KR); Kyung-geun Lee, Seongnam-si (KR); Chang-jin Yang, Yongin-si (KR); Tatsuhiro Otsuka, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 804 days.

(21) Appl. No.: 10/985,017

(22) Filed: Nov. 10, 2004

(65) Prior Publication Data

US 2005/0147012 A1 Jul. 7, 2005

(30) Foreign Application Priority Data

Nov. 11, 2003 (KR) .................. 10-2003-0079620

(51) Int. Cl.
*G11B 7/24* (2006.01)
*G11B 7/00* (2006.01)

(52) U.S. Cl. ............... 369/275.4; 369/59.11; 369/59.1; 369/116

(58) Field of Classification Search .................. None
See application file for complete search history.

(56) References Cited

U.S. PATENT DOCUMENTS

| 6,205,102 | B1* | 3/2001 | Spruit | 369/59.11 |
| 2002/0167879 | A1* | 11/2002 | Ohno | 369/59.11 |
| 2003/0090981 | A1* | 5/2003 | Yokoi | 369/59.11 |
| 2006/0256689 | A1* | 11/2006 | Kato | 369/59.11 |

\* cited by examiner

*Primary Examiner*—Muhammad N. Edun
(74) *Attorney, Agent, or Firm*—Stein, McEwen & Bui, LLP

(57) ABSTRACT

An information storage medium and a method and apparatus recording data to the information storage medium, the information storage medium having a write pattern for recording data, the write pattern including at least one pulse and a number of the at least one pulse being determined depending on a length of a recording mark. This makes it possible to record data using a write pattern having an optimal number of pulses, thereby preventing degradation in jitter characteristics due to residual heat or heat build-up caused by the use of unnecessary pulses even during high speed recording.

22 Claims, 9 Drawing Sheets

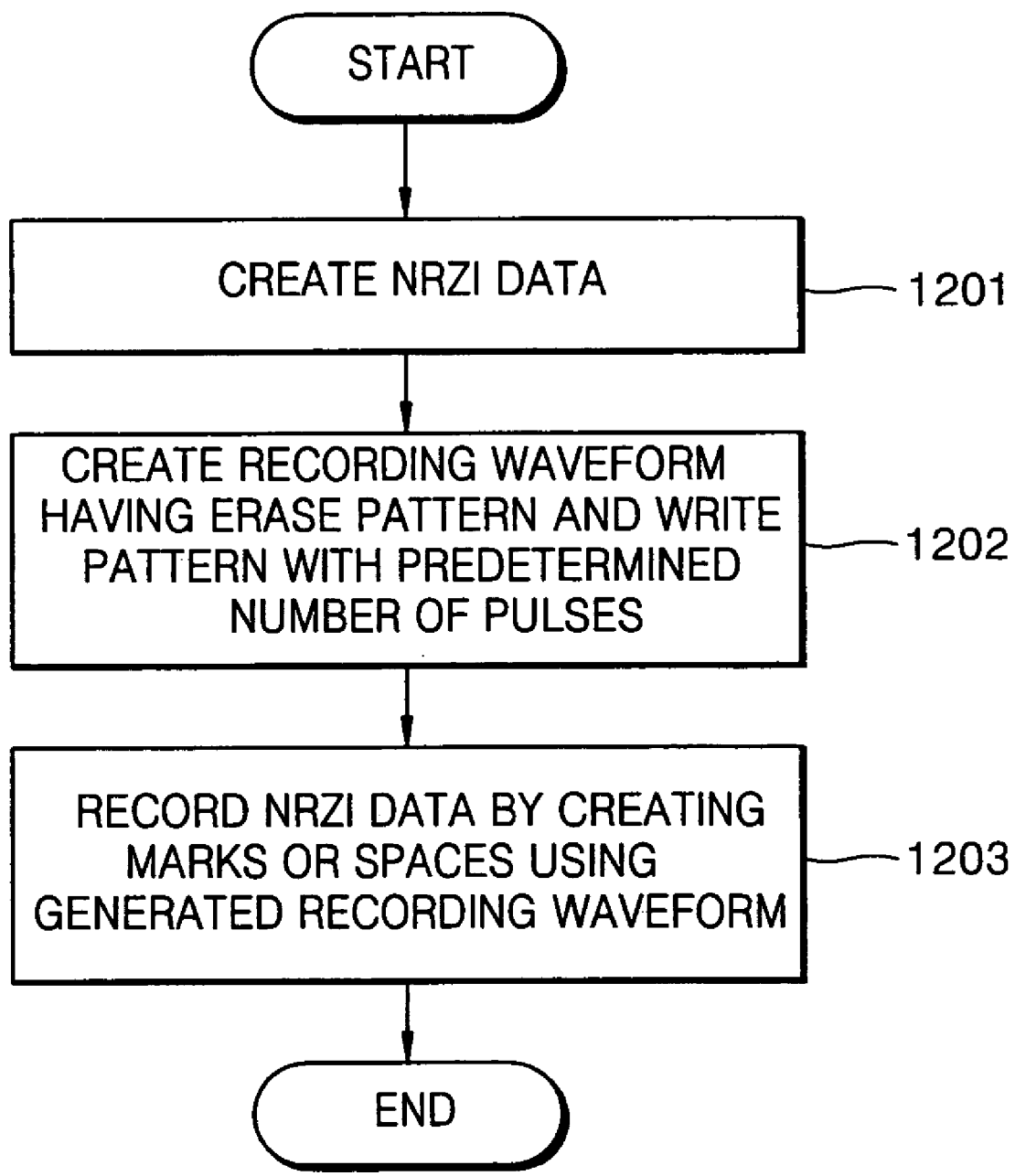

INFORMATION STORAGE MEDIUM AND METHOD AND APPARATUS FOR RECORDING DATA THEREON

CROSS-REFERENCE TO RELATED APPLICATION

This application claims the benefit of Korean Patent Application No. 2003-79620, filed on Nov. 11, 2003 in the Korean Intellectual Property Office, the disclosure of which is incorporated herein by reference.

BACKGROUND OF THE INVENTION

1. Field of the Invention

The present invention relates to an information storage medium on which data is recorded using an optimal writing strategy to achieve high-speed recording while improving jitter characteristics and a method and apparatus for recording data on the information storage medium.

2. Description of the Related Art

An optical pickup performs non-contact recording/reproducing to/from an information storage medium such as an optical disk. Optical disks are classified into compact disks (CDs) and digital versatile disks (DVDs) depending on data recording capacity. Examples of optical disks capable of writing and reading information include 650 MB CD-Recordable (CD-R), CD-Rewritable (CD-RW), 4.7 GB DVD+R/RW, DVD-Random Access Memory (RAM), and DVD-R/RW. Examples of read-only media include 650 MB CD-ROM and 4.7 GB DVD-ROM. Furthermore, high definition-DVDs (HD-DVDs) with recording capacity of over 20 GB are currently being developed.

When writing data on an optical disk, which is one type of an optical recording medium, marks are created in tracks on the optical disk. For read-only disks such as CD-ROM or DVD-ROM, marks are produced in the form of pits. For recordable disks such as CD-R/RW and DVD-R/RW/RAM, a recording layer is coated with phase change material that changes between amorphous and crystalline states. A laser is focused on the phase change layer to create amorphous marks. For the recordable disks, different writing strategies are implemented for a disk to optimize the recording and/or reproducing performance. Since recording conditions may also vary depending on the type of a drive, the drive may not be compatible with an optical recording medium.

From a signal detection perspective, a data recording method is classified into mark edge recording technique and mark position recording technique. In a mark position recording technique, the amplitude of a detected RF signal changes from positive-negative to negative-positive at a point where a mark is written. On the other hand, in a mark edge recording technique, the amplitude of a detected RF signal changes from positive-negative to negative-positive at both edges of a mark. Thus, writing the mark edge accurately is critical for increasing the quality of a RF signal.

However, for a disk having a phase change layer, the shape of a trailing edge of a mark written varies depending on the length of a mark or a space between marks. That is, the trailing edge of a mark written according to the conventional recording technique, which is longer than the leading edge, is one of the factors that degrade recording and/or reproducing performance. Longer recording marks results in such degradation due to heat buildup.

FIG. 1 shows a recording waveform produced when recording Non Return to Zero Inverted (NRZI) data according to a conventional recording technique. T is the duration of a reference recording/reproducing clock signal. In mark edge recording, high and low levels of NRZI data are recorded as mark and space, respectively. A waveform used for recording marks is called a write pattern while a waveform used for recording spaces (or erasing marks) is called an erase pattern. The conventional recording waveform uses multi-pulses as a write pattern, and the power level of each pulse is adjusted using Pw, Pe, and Pb that are write power, erase power, and bias power, respectively. That is, the power levels Pw and Pe are used for a multi-pulse in the write pattern. In particular, power Pe used for the erase pattern is kept at a predetermined DC level.

Since the power level Pe in the erase pattern of the conventional recording waveform is kept at a specified DC level for a predetermined period of time, heat in a temperature range of 0 to 200° C. is continuously applied to a region to be erased. Repeating a writing operation numerous times results in distortion of the shape of a mark, thereby significantly degrading the recording and/or reproducing characteristics. In particular, this degradation becomes more severe when the duration T of a reference recording and/or reproducing clock signal decreases and thermal interference between pulses in a recording waveform increases as demand for high density and high speed recording increases.

That is, since erase DC power is applied to erase recorded data during recording, carrier-to-noise ratio (C/N) in a recorded and/or reproduced signal decreases due to thermal interference between write pulses. This also causes incomplete formation of recording marks (partially crystallized) as well as degradation in reproducing characteristics. During high-speed recording intended to increase data transfer rate, the degree of distortion in a recorded and/or reproduced signal significantly increases. Furthermore, the use of a multi-pulse as a write pulse necessary for high-speed recording causes residual heat that adversely affects successive marks or spaces. The heat buildup due to such excessive use may result in abnormal formation of marks.

SUMMARY OF THE INVENTION

According to an aspect of the present invention, there is provided an information storage medium having recorded thereon information using a writing strategy optimized for high-speed recording and a method and apparatus recording data on the information storage medium.

According to an aspect of the present invention, there is also provided an information storage medium having recorded thereon information on a number of write pulses used for different recording speed and a method and apparatus recording data on the information storage medium.

According to an aspect of the present invention, there is provided an information storage medium to and/or from which data is recorded and/or reproduced, wherein a write pattern for recording data contains at least one pulse and the number of the at least one pulse is determined depending on the length of a recording mark.

According to an aspect of the present invention, the recording mark has a length of NT where N is a natural number and T is the duration of a reference recorded/reproduced clock signal, and the write pattern contains N–2 pulses when N is greater than or equal to 3 or N–1 pulses when N is 2.

According to an aspect of the present invention, the recording mark may have a length of NT where N is a natural number and T is the duration of a reference recorded/reproduced clock signal, and the write pattern may contain N–2 pulses when N is greater than 3 or N–1 pulses when N is 2 or 3.

According to another aspect of the present invention, the write pattern contains a first pulse, a multi-pulse train, and a last pulse, and the duration of the last pulse is zero. Alternatively, the write pattern may contain a first pulse and a multi-pulse train. A starting position of each pulse in the multi-pulse train may be shifted away from a predetermined reference time.

According to another aspect of the present invention, there is provided a method of recording data to an information storage medium. The method includes generating a recording waveform including a write pattern having pulses whose number is determined depending on the length of a recording mark and creating a mark and a space using the generated recording waveform.

According to another aspect of the present invention, there is provided an apparatus recording data to an information storage medium including a recording waveform generating circuit generating a recording waveform including a write pattern with pulses whose number is determined depending on the length of a recording mark and a pickup unit emitting a beam onto the information storage medium according to the generated recording waveform and creating spaces or marks for recording incoming data.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the present invention will become more apparent and more readily appreciated from the following description of the embodiments, taken in conjunction with the accompanying drawings of which:

FIG. 10 is a flowchart illustrating a method of recording data according to an embodiment of the present invention.

DETAILED DESCRIPTION OF THE EMBODIMENTS

Figure 1:
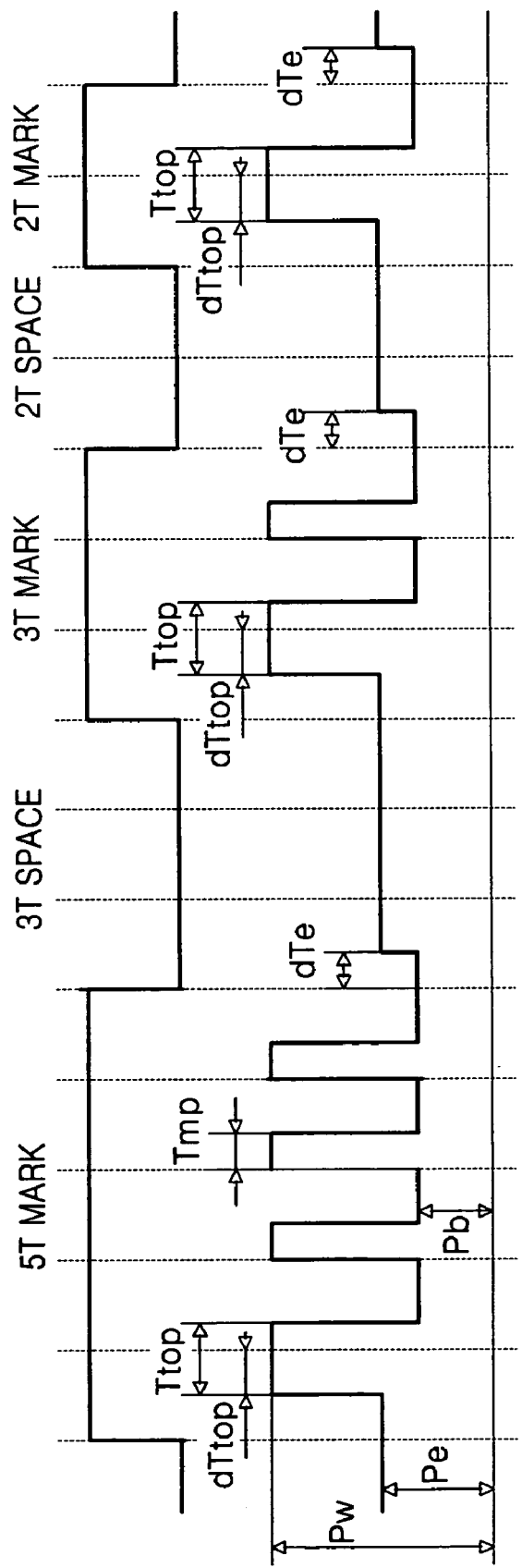
FIG. 1 shows a conventional recording waveform.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
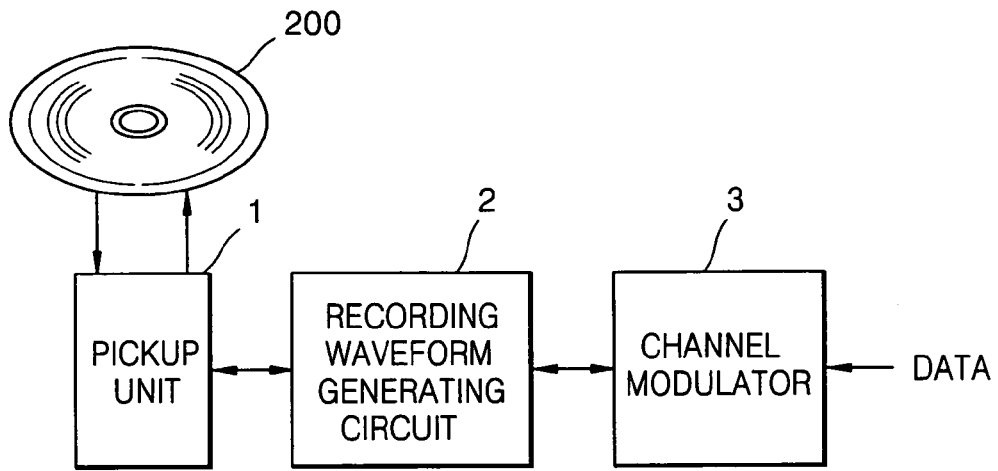
FIG. 2 is a block diagram of an apparatus recording data according to an embodiment of the present invention.

Referring to FIG. 2, an apparatus recording data by creating marks or spaces on an information storage medium 200 includes a pickup unit 1, a recording waveform generating circuit 2, and a channel modulator 3. The channel modulator 3 modulates input data into a channel bit stream. The recording waveform generating circuit 2 receives the channel bit stream and generates a recording waveform used for recording the same. The recording waveform generated according to the present invention includes write pattern and erase pattern corresponding to high-speed recording. The recording waveform will be described in greater detail later. The pickup unit 1 focuses light on the information storage medium 200 to create marks or spaces.

Figure 3:
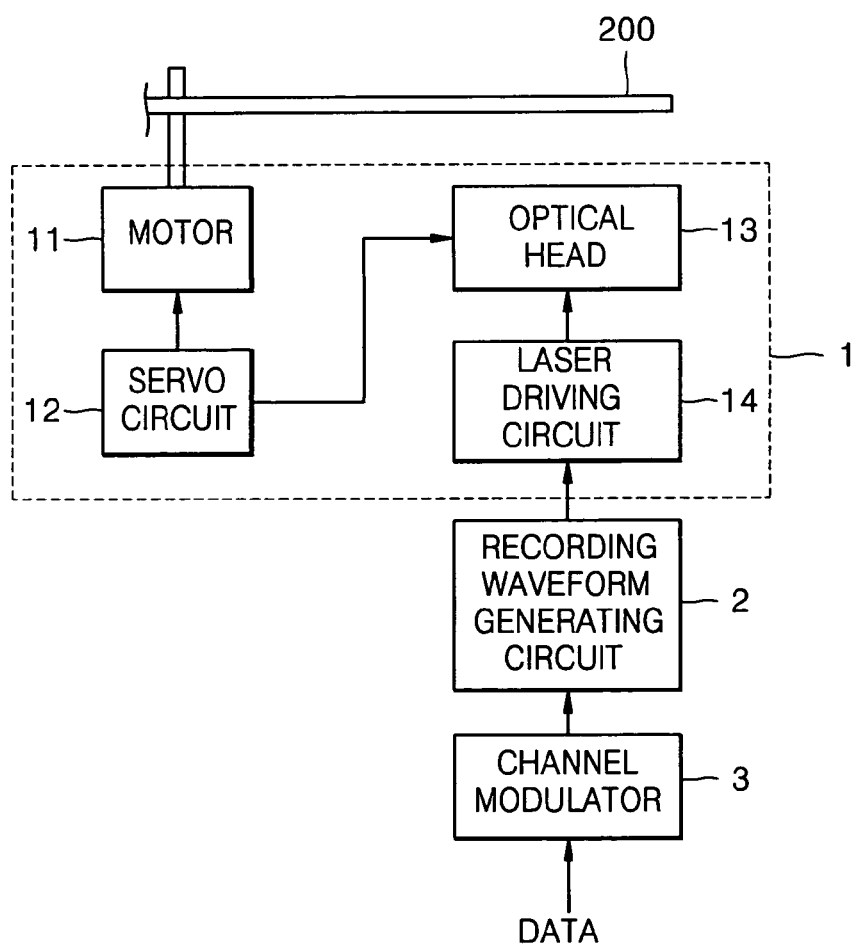
FIG. 3 shows an example of the recording apparatus of FIG. 2.

FIG. 3 is an example of the apparatus of FIG. 2. A block performing the same function is assigned the same numeral as shown in FIG. 2, and a detailed description thereof will not be given. Referring to FIG. 3, a recording apparatus includes a pickup unit 1, a recording waveform generating circuit 2, and a channel modulator 3. The pickup unit 1 includes a motor 11 that rotates an information storage medium 200, an optical head 13 that emits a laser beam onto the information storage medium 200 and receives a laser beam reflected from the information storage medium 200, a servo circuit 12 that performs servo control on the motor 11 and the optical head 13, and a laser driving circuit 14 that drives a laser (not shown) mounted on the optical head 13. The channel modulator 3 modulates input data into a channel bit stream and outputs Non Return to Zero Inverted (NRZI) data. The recording waveform generating circuit 2 generates a recording waveform used for recording NRZI data and outputs the same recording waveform to the laser driving circuit 14 in the pickup unit 1. The laser driving circuit 14 uses the received recording waveform in controlling the laser to create marks or spaces on the information storage medium 200.

Figure 4:
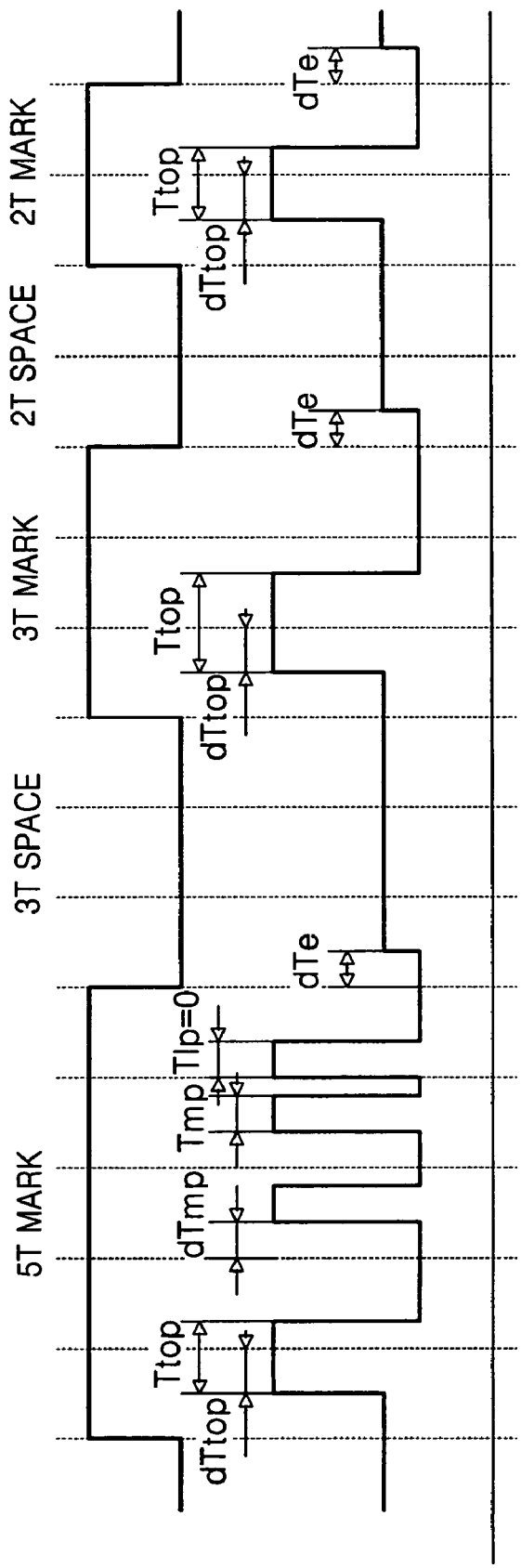
FIG. 4 shows an example of a recording waveform applied to an information storage medium according to a first embodiment of the present invention.

FIG. 4 shows an example of a recording waveform generated by the recording waveform generating circuit 2 and applied to an information storage medium according to a first embodiment of the present invention. The NRZI data varies depending on a modulation scheme performed by the channel modulator 3. For example, a Run Length Limited (RLL) (1,7) modulation scheme produces recording marks with a length of 2T to 8T while a RLL (2,10) modulation scheme produces recording marks with a length of 3T to 11T.

When high and low levels of NRZI data are recorded as mark and space, a write pattern used for creating marks with a length of NT on the information storage medium according to the first embodiment of the present invention contains N−1 multi-pulses. Multi-pulses include a first pulse, a multi-pulse train, and a last pulse.

In FIG. 4, Ttop, Tmp, and Tlp respectively denote the duration of a first pulse, the duration of each pulse in a multi-pulse train ("duration of a multi-pulse"), and the duration of a last pulse. In the illustrative embodiment, in order to improve jitter characteristics of data, the duration Tlp of the last pulse in the multi-pulse may preferably, but not necessarily, be zero.

Meanwhile, when the recording waveform is divided by the period T of a reference recorded and/or reproduced clock signal and a starting position for each period is a reference time, a starting position of each pulse may be shifted from the reference time. In FIG. 4, dTtop, dTmp, and dTlp respectively denote times during which the first pulse, the multi-pulse train, and the last pulse are shifted from their reference times, and dTe denote the time during which an erase pulse is shifted from the reference time.

In the illustrative embodiment, the multi-pulse train may preferably, but not necessarily, have the time dTmp shifted from the reference time position. Furthermore, since the last recording pulse more significantly affects the formation of a recording mark edge as recording speed increases, the multi-pulse may preferably, but not necessarily, contain the last write pulse with the time dTlp shifted from the reference position.

Table 1 shows the conditions of an experiment made to find how much the shift time dTlp of the last write pulse affects jitter characteristics by varying the shift time dTlp.

TABLE 1

| Laser wavelength | 405 nm |
| Numerical aperture (NA) | 0.85 |
| User data transfer rate | 35.965(Mbits/s) × 2 |
| Recording speed | 5.28(m/s) × 2 |
| User data capacity | 23.305 Gbytes |
| Track pitch | 0.32 μm |
| Pw/Pe/Pb | 5.7 mW/3.0 mW/0.2 mW |
| Ttop/dTtop/Tmp/Tlp/dTe | 3 ns/0 ns/3 ns/3 ns/3 ns |
| dTlp | 2.5 ns(left shift) ~ 2.5 ns(right shift) |

Figure 5:
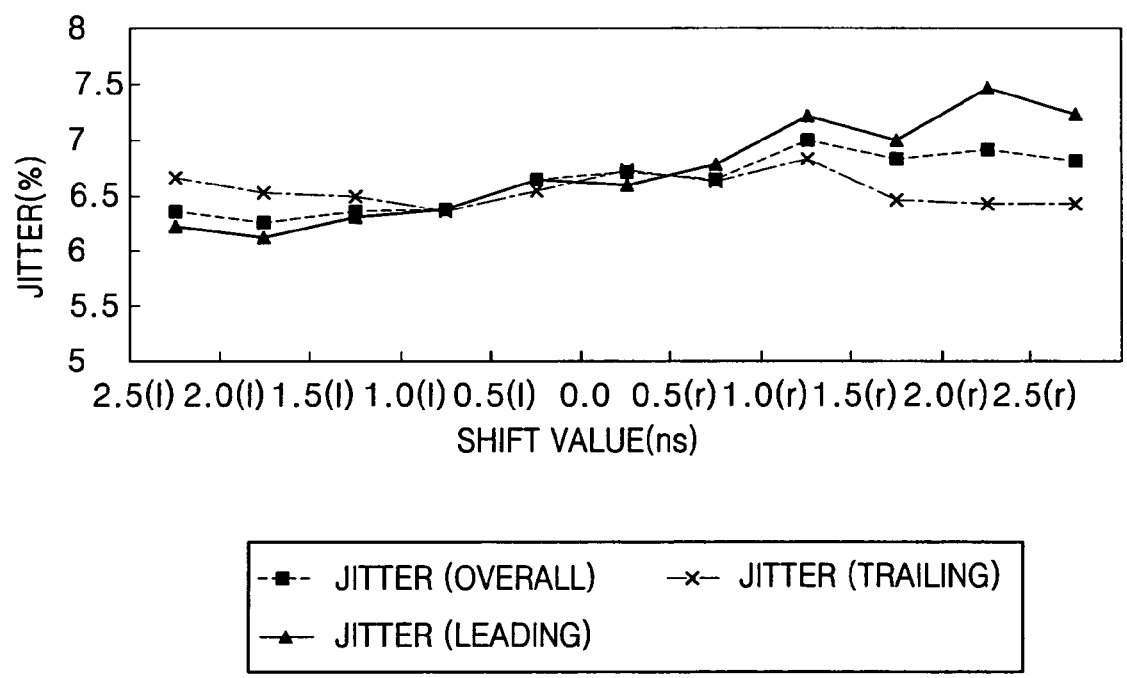
FIG. 5 shows jitter characteristics measured when shift of a laser pulse in a recording waveform occurs.

FIG. 5 shows jitters measured by shifting a last pulse where (l) denotes a shift to the left of the recording waveform and (r) denotes a shift to the right. As is evident from FIG. 5, jitter characteristics are improved when the last pulse is shifted left away from a specified reference time position, and a jitter for a leading edge are improved while that for a trailing edge remains almost unchanged. That is, heat still resides due to the unnecessary duration Tlp of the last pulse and affects the formation of a leading edge of a successive recording mark.

Jitters are improved until the last pulse is shifted left so that the last pulse meets multi-pulse before the last pulse. Considering this point, the last pulse of the multi-pulse train in a conventional write pattern can be determined to adversely affect the formation of recording marks during recording over 2× speeds.

Therefore, in order to improve jitter characteristics, Tlp may be kept at a minimum, and the multi-pulse train may be shifted right or Tmp is changed to minimize the effects of Tlp on a trailing edge during formation of a recording mark. To achieve this purpose, the recording waveform contains the last pulse with the duration Tlp of approximately zero and the multi-pulse train with the time dTmp shifted from the reference time position.

In a first recording waveform used for the information storage medium according to the first embodiment of the present invention, a write pattern used for writing a mark of length NT contains N−2 write pulses when N is a natural number greater than or equal to 3 or N−1 write pulses when N is 2. In addition, the write pulses contain the last pulse having the duration of Tlp and Tlp set to zero. In this case, to minimize the Tlp's effects of temperature compensation on the formation of recording marks, the write pulses contain the shift time dTmp for shifting right the multi-pulse train having the duration of Tmp.

On the other hand, in a second recording waveform used for the information storage medium according to the first embodiment of the present invention, a write pattern used for writing a mark of the length of NT contains N−2 write pulses when N is a natural number greater than or equal to 3 or N−1 write pulses when N is 2. In addition, the write pulses contain the shift time dTmp for shifting the multi-pulse train to the right.

Table 2 shows jitter characteristics measured for first and second recording waveforms according to an aspect of the present invention and a conventional recording waveform.

TABLE 2

| | Jitter measured as a result of multi-track recording | | | | | |
|---|---|---|---|---|---|---|
| | Conventional write pulse Pw/Pe/Pb = 5.6/3.0/0.2 | | | First and second write pulses (Present invention) Pw/Pe/Pb = 5.7/3.1/0.2 | | |
| | Overall | Leadin | Trailing | Overall | Leading | Trailing |
| 1 time | 6.9% | 8.2% | 5.5% | 6.4% | 7.0% | 5.4% |
| 10 times | 6.7% | 7.3% | 6.1% | 6.4% | 7.0% | 5.4% |
| 100 times | 6.7% | 7.3% | 6.4% | 6.4% | 6.8% | 5.3% |
| 1000 times | 7.1% | 7.8% | 6.4% | 6.4% | 6.9% | 5.5% |
| Write power | Pw/Pe/Pb = 5.7/3.0/0.2 | | | Pw/Pe/Pb = 5.8/3.1/0.2 | | |
| Recording waveform (2T) | Ttop/dTtop/Tmp/dTe = 2.5 ns/0.5 ns/3 ns/1.5 ns | | | Recording waveform 1 | Ttop/dTtop/Tmp/dTe/dTmp/Tlp = 2.5 ns/0 ns/3.0 ns/1.5 ns/2.5 ns/ 0 ns | |
| Recording waveform (over 3T) | Ttop/dTtop/Tmp/dTe = 3 ns/0 ns/3 ns/1.5 ns | | | Recording waveform 2 | Ttop/dTtop/Tmp/dTe/dTmp = 2.5 ns/0 ns/3.0 ns/1.5 ns/2.5 ns | |
| | | | | Recording waveform 1 | Ttop/dTtop/Tmp/dTe/dTmp/Tlp = 3.0 ns/0 ns/3.0 ns/1.5 ns/2.5 ns/ 0 ns | |
| | | | | Recording waveform 2 | Ttop/dTtop/Tmp/dTe/dTmp = 3.0 ns/0 ns/3.0 ns/1.5 ns/2.5 ns | |

Figure 9:
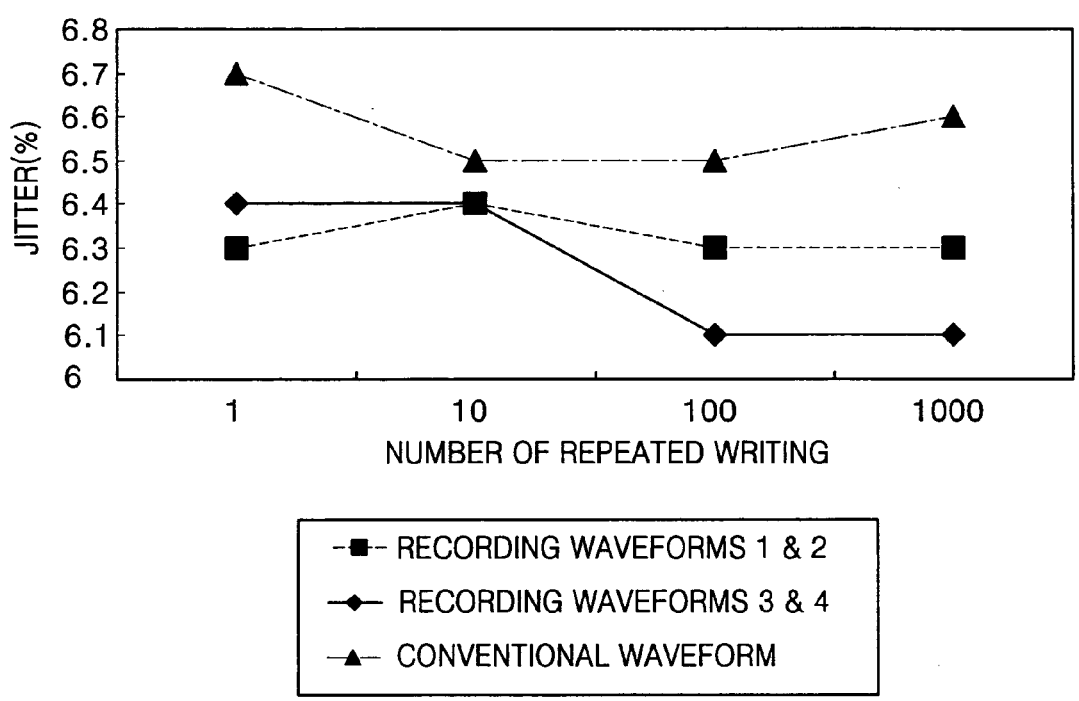
FIG. 9 shows jitter characteristics measured on the information storage mediums to which information has been recorded according to the recording waveforms shown in FIGS. 4, 6, 7, and 8, as compared to those measured on an information storage medium to which information has been recorded according to a conventional recording waveform.

As is evident from Table 2 and FIG. 9, jitter characteristics measured when data is recorded using first and second write pulses are approximately 0.3 to 1% lower than those measured when data is recorded using the conventional write pulse. FIG. 9 is a graph showing jitter characteristics with respect to the number of times that data is recorded according to the conventional write pulse, the first and second write pulses according to the first embodiment of the present invention, and third and fourth write pulses according to a second embodiment of the present invention, respectively.

Specifically, as shown in FIG. 4, NRZI data contains a write pattern for recording a 5T mark, an erase pattern for forming a 3T space, a write pattern for recording a 3T mark, an erase pattern for forming a 2T space, and a write pattern for recording a 2T mark. The write pattern for recording the 5T mark includes the first pulse, the multi-pulse train, and the last pulse. The write pattern consists of three writing pulses and the duration Tlp of the last write pulse is zero. The write pattern also contains the time dTmp for shifting the multi-pulse train. The erase pattern of a DC level for creating the 3T space is shifted by the time dTe while the write pattern for recording the 3T mark contains a singe pulse, i.e., a first pulse. The erase pattern of a DC level is used for creating the 2T space while the write pattern for recording the 2T mark contains only a first pulse.

Figure 6:
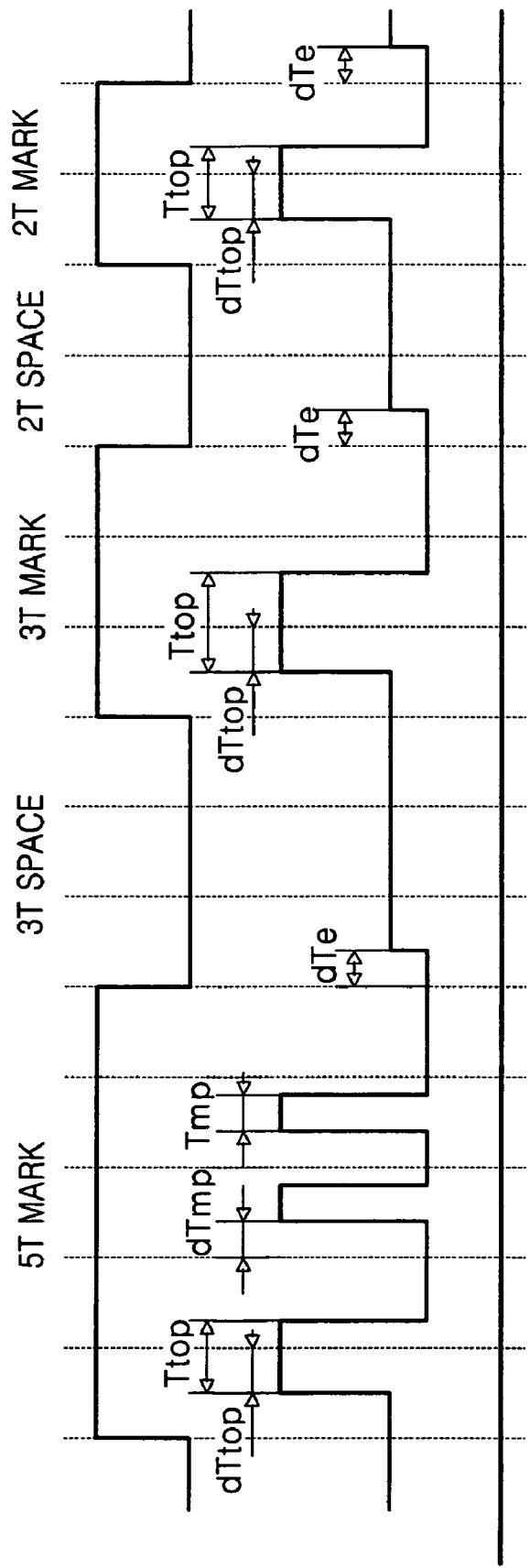
FIG. 6 shows a modified example of a recording waveform applied to the information storage medium according to the first embodiment of the present invention.

Referring to FIG. 6, a write pattern for recording a 5T mark consists of three pulses and includes a first pulse and a multi-pulse train. Here, the write pattern does not include a last-pulse.

recording the 3T mark consists of two pulses and includes a first pulse and a multi-pulse train shifted by dTmp. The erase pattern of a DC level is used for creating the 2T space while the write pattern for recording the 2T mark has a first pulse.

Figure 8:
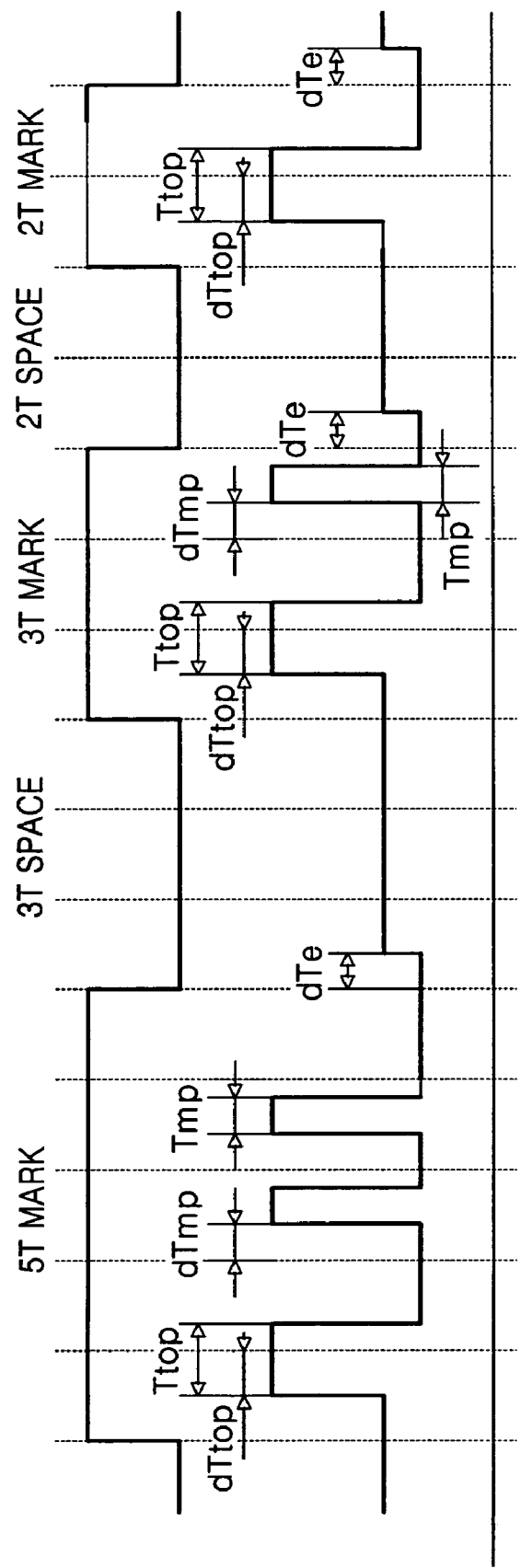

Referring to FIG. 8, a write pattern for recording a 5T mark consists of three pulses and includes a first pulse and a multi-pulse train. A write pattern for recording a 3T mark contains two pulses, i.e., a first pulse and a multi-pulse train shifted by dTmp.

Table 3 shows the constructions of the third and fourth recording waveforms according to the second embodiment of the present invention, as well as jitter characteristics measured when data is recorded repeatedly using the third and fourth recording waveforms.

TABLE 3

Jitter measured as a result of multi-track recording

| | Conventional write pulse Pw/Pe/Pb = 5.6/3.0/0.2 | | | Third and fourth write pulses (Present invention) | | |
|---|---|---|---|---|---|---|
| | Overall | Leadin | Trailing | Overall | Leading | Trailing |
| 1 time | 6.9% | 8.2% | 5.5% | 6.1% | 6.6% | 5.7% |
| 10 times | 6.7% | 7.3% | 6.1% | 6.3% | 7.0% | 5.6% |
| 100 times | 6.7% | 7.3% | 5.9% | 6.1% | 6.8% | 5.4% |
| 1000 times | 7.2% | 7.9% | 6.4% | 6.0% | 6.7% | 5.3% |
| Write power | Pw/Pe/Pb = 5.7/3.0/0.2 | | | Pw/Pe/Pb = 5.8/3.1/0.2 | | |
| Recording waveform (2T) | Ttop/dTtop/Tmp/dTe = 2.5 ns/0.5 ns/3 ns/1.5 ns | | | Recording waveform 3 | Ttop/dTtop/Tmp/dTe/dTmp/Tlp = 2.5 ns/0 ns/3.0 ns/1.5 ns/2.5 ns/ 0 ns | |
| Recording waveform (over 3T) | Ttop/dTtop/Tmp/dTe = 3 ns/0 ns/3 ns/1.5 ns | | | Recording waveform 4 | Ttop/dTtop/Tmp/dTe/dTmp = 2.5 ns/0 ns/3.0 ns/1.5 ns/2.5 ns | |
| | | | | Recording waveform 3 | Ttop/dTtop/Tmp/dTe/dTmp/Tlp = 3.0 ns/0 ns/3.0 ns/1.5 ns/2.5 ns/ | |
| | | | | Recording waveform 4 | Ttop/dTtop/Tmp/dTe/dTmp = 3.0 ns/0 ns/3.0 ns/1.5 ns/2.5 ns | |

A recording waveform used for recording data to an information storage medium according to a second embodiment of the present invention may contain N−2 write pulses when N is a natural number greater than 3 or N−1 write pulses when N is 2 or 3 in order to write a mark of the length of NT. Here, when N is a natural number greater than 3, the duration Tlp of a last pulse is set to zero. To minimize the Tlp's effects of temperature compensation on the formation of a recording mark, a multi-pulse train with the duration Tmp may preferably, but not necessarily, be shifted, and more preferably, but not necessarily, to the right, i.e., to a direction in which recording terminates.

A modified example of a recording waveform used for the information storage medium may contain N−2 write pulses when N is a natural number greater than 3 or N−1 write pulses when N is 2 or 3 in order to record a mark of the length of NT. In addition, the recording waveform may contain the time dTmp for shifting a multi-pulse train, but not a last pulse.

Figure 7:
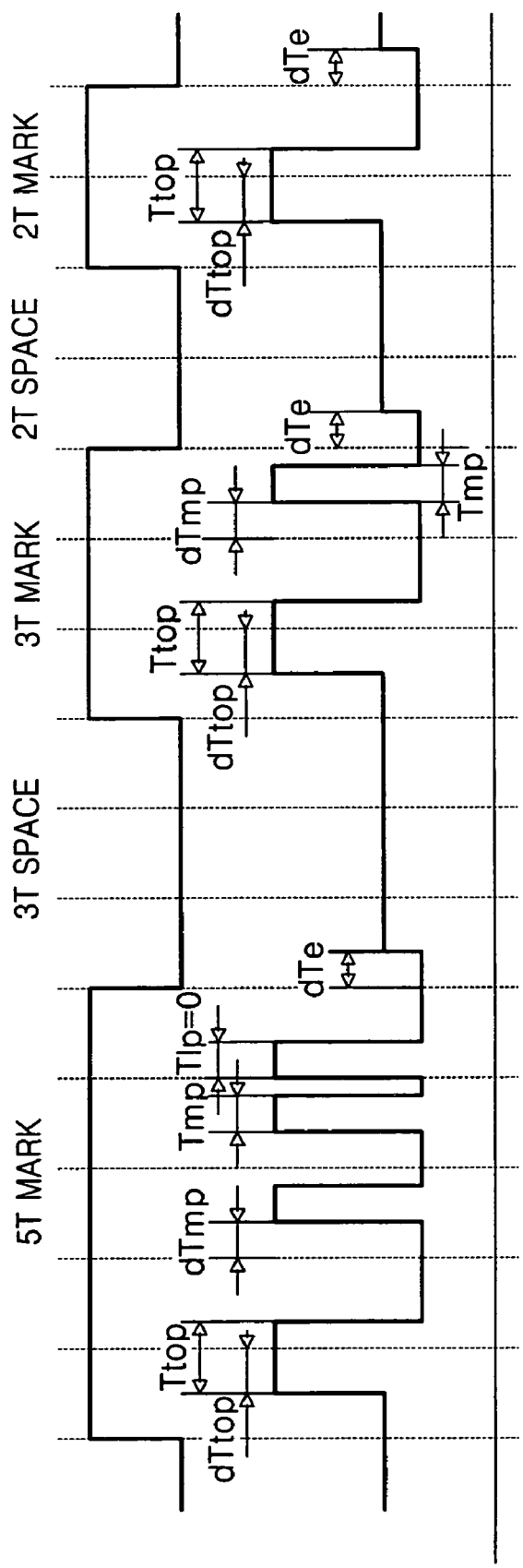
FIGS. 7 and 8 are examples of recording waveforms applied to an information storage medium according to an embodiment of the present invention.

Specifically, as shown in FIG. 7, NRZI data contains a write pattern for recording a 5T mark, an erase pattern for forming a 3T space, a write pattern for recording a 3T mark, an erase pattern for forming a 2T space, and a write pattern for recording a 2T mark. The write pattern for recording the 5T mark includes the first pulse, the multi-pulse train, and the last pulse. The write pattern consists of three writing pulses and the duration Tlp of the last write pulse is zero. The write pattern also contains the time dTmp for shifting the multi-pulse train. The erase pattern of a DC level for creating the 3T space is shifted by the time dTe while the write pattern for As is evident from Table 3, jitter characteristics measured when data is recorded according to the second embodiment during 2× speed recording are approximately 0.4 to 1.2% lower than those measured when data is recorded using the conventional write pulse.

Based on the foregoing, a method of recording data according to an embodiment will now be described with reference to FIG. 10. Referring to FIG. 10, in operation S1201, a recording apparatus receives input data and modulates the same to generate NRZI data. In operation S1202, the recording apparatus generates a recording waveform having write pattern and erase pattern according to the present invention to achieve high-speed recording while improving jitter characteristics. The write pattern may contain N−2 write pulses when N is a natural number greater than 3 to record a mark of a length of NT and the time dTmp for shifting the multi-pulse train. While the write pattern may contain a last pulse or not, the duration Tlp is set to zero when the last pulse is present. The write pattern contains only a first pulse when N is 2 or 3. Alternatively, it may contain two pulses when N is 3 and only a first pulse when N is 2. In operation 1203, the recording apparatus creates a mark or a space on an information storage medium using the recording waveform.

While the present invention has been described with reference to the recording waveforms for recording 5T, 3T, and 2T marks and spaces, it will become apparent to a person skilled in the relevant art to produce write patterns and/or erase patterns for creating 2T, 4T to 6T, and 8T to maximum length marks and spaces.

The present invention allows data to be recorded using a write pattern having the optimal number of pulses, thereby preventing degradation in jitter characteristics due to residual heat or heat build-up caused by the use of unnecessary pulses even during high speed recording. Furthermore, the present invention achieves excellent jitter characteristics by shifting a multi-pulse train in a recording waveform and setting the duration of a last pulse to zero, thereby improving recording and/or reproducing characteristics.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An information storage medium to and/or from which data is recorded and/or reproduced as a recording mark and a space, wherein a write pattern for recording the data comprises at least one pulse and a number of the at least one pulse is determined depending on a length of the recording mark, and wherein the recording mark has a length of NT where N is a natural number and T is a period of a reference recorded/reproduced clock signal, and the write pattern comprises N−2 pulses when the N is greater than or equal to 3 or N−1 pulses when N is 2.

2. The information storage medium of claim 1, wherein the write pattern comprises a first pulse, a multi-pulse train, and a last pulse, and a duration of the last pulse is zero.

3. The information storage medium of claim 2, wherein a starting position of each pulse in the multi-pulse train is shifted away from a predetermined reference time.

4. The information storage medium of claim 1, wherein the write pattern comprises a first pulse and a multi-pulse train.

5. The information storage medium of claim 4, wherein a starting position of each pulse in the multi-pulse train is shifted away from a predetermined reference time.

6. The information storage medium of claim 1, wherein the recording mark is erased by an erase pattern having a DC power level.

7. An information storage medium to and/or from which data is recorded and/or reproduced as a recording mark and a space, wherein a write pattern for recording the data comprises at least one pulse and a number of the at least one pulse is determined depending on a length of the recording mark, and wherein the recording mark has a length of NT where N is a natural number and T is a duration of a reference recorded/reproduced clock signal, and the write pattern comprises N−2 pulses when N is greater than 3 or N−1 pulses when N is 2 or 3.

8. A method of recording data as a recording mark and a space on an information storage medium, comprising:
   generating a recording waveform comprising a write pattern having pulses whose number is determined depending on a length of the recording mark; and
   creating the recording mark and the space using the generated recording waveform,
   wherein the recording mark has a length of NT where N is a natural number and T is a period of a reference recorded/reproduced clock signal, and the write pattern comprises N−2 pulses when N is greater than or equal to 3 or N−1 pulses when N is 2.

9. The method of claim 8, wherein the write pattern comprises a first pulse, a multi-pulse train, and a last pulse, and a duration of the last pulse is zero.

10. The method of claim 9, wherein a starting position of each pulse in the multi-pulse train is shifted away from a predetermined reference time.

11. The method of claim 8, wherein the write pattern comprises a first pulse and a multi-pulse train.

12. The method of claim 11, wherein a starting position of each pulse in the multi-pulse train is shifted away from a predetermined reference time.

13. A method of recording data as a recording mark and a space on an information storage medium, comprising:
   generating a recording waveform comprising a write pattern having pulses whose number is determined depending on a length of the recording mark; and
   creating the recording mark and the space using the generated recording waveform, wherein the recording mark has a length of NT where N is a natural number and T is a period of a reference recorded/reproduced clock signal, and the write pattern comprises N−2 pulses when N is greater than 3 or N−1 pulses when N is 2 or 3.

14. An apparatus recording data on an information storage medium, the apparatus comprising:
   a recording waveform generating circuit generating a recording waveform comprising a write pattern with pulses whose number is determined depending on a length of a recording mark; and
   a pickup unit emitting a beam onto the information storage medium according to the generated recording waveform and creating recording marks or spaces for recording input data,
   wherein the recording mark has a length of NT where N is a natural number and T is a period of a reference recorded/reproduced clock signal, and the recording waveform generating circuit generates the recording waveform comprising the write pattern having N−2 pulses when N is greater than or equal to 3 or N−1 pulses when N is 2.

15. An apparatus recording data on an information storage medium, the apparatus comprising:
   a recording waveform generating circuit generating a recording waveform comprising a write pattern with pulses whose number is determined depending on a length of a recording mark; and
   a pickup unit emitting a beam onto the information storage medium according to the generated recording waveform and creating recording marks or spaces for recording input data,
   wherein the recording mark has a length of NT where N is a natural number and T is a period of reference recorded/reproduced clock signal, and the recording waveform generating circuit generates the recording waveform comprising the write pattern having N−2 pulses when N is greater than 3 or N−1 pulses when N is 2 or 3.

16. A method of recording data on an information storage medium, the method comprising:
   receiving input data and modulating the input data generating output data;
   generating a recording waveform having a write pattern and an erase pattern having a predetermined number of pulses; and
   recording the output data on the information storage medium by creating recording marks and spaces using the generated recording waveform, wherein the predetermined number of pulses is determined based upon a length of the recording marks,
   wherein the recording marks have a length of NT, where N is a natural number and T is a period of a reference recorded and/or reproduced clock signal, and the write pattern comprises N−2 pulses when the N is greater than 3 or N−1 pulses when N is 2.

17. The method of claim 16, wherein the write pattern comprises a first pulse, a multi-pulse train, and a last pulse, and a duration of the last pulse is zero.

18. The method of claim 17, wherein a starting position of each pulse in the multi-pulse train is shifted away from a predetermined reference time.

19. The method of claim 16, wherein the write pattern comprises a first pulse and a multi-pulse train.

20. The method of claim 19, wherein a starting position of each pulse in the multi-pulse train is shifted away from a predetermined reference time.

21. The method of claim 16 wherein the output data is Non Return to Zero Inverted (NRZI) data.

22. A method of recording data on an information storage medium, the method comprising:

receiving input data and modulating the input data generating output data;

generating a recording waveform having a write pattern and an erase pattern having a predetermined number of pulses; and recording the output data on the information storage medium by creating recording marks and spaces using the generated recording waveform, wherein the predetermined number of pulses is determined based upon a length of the recording marks, wherein the recording marks have a length of NT, where N is a natural number and T is a period of a reference recorded and/or reproduced clock signal, and the write pattern comprises N−2 pulses when the N is greater than 3 or N−1 pulses when N is 2 or 3.

* * * * *

UNITED STATES PATENT AND TRADEMARK OFFICE
CERTIFICATE OF CORRECTION

| | | |
|---|---|---|
| PATENT NO. | : 7,453,790 B2 | Page 1 of 1 |
| APPLICATION NO. | : 10/985017 | |
| DATED | : November 18, 2008 | |
| INVENTOR(S) | : Wook-yeon Hwang et al. | |

It is certified that error appears in the above-identified patent and that said Letters Patent is hereby corrected as shown below:

Column 11, line 1, insert --or equal to-- after "than".

Signed and Sealed this

Sixth Day of January, 2009

JON W. DUDAS
*Director of the United States Patent and Trademark Office*